(12) United States Patent
Mahurin et al.

(10) Patent No.: US 10,233,098 B2
(45) Date of Patent: Mar. 19, 2019

(54) NANOPOROUS GRAPHENE MEMBRANE FOR DESALINATION OF SALT WATER

(71) Applicants: UT-Battelle, LLC, Oak Ridge, TN (US); New Mexico State University, Las Cruces, NM (US)

(72) Inventors: Shannon Mark Mahurin, Lenoir City, TN (US); Ivan Vlassiouk, Oak Ridge, TN (US); Sheng Dai, Knoxville, TN (US); Sumedh Pradeep Surwade, Greenville, DE (US); Raymond R. Unocic, Knoxville, TN (US); Sergei Smirnov, Las Cruces, NM (US)

(73) Assignees: UT-Battelle, LLC, Oak Ridge, TN (US); New Mexico State University, Las Cruces, NM (US)

( * ) Notice: Subject to any disclaimer, the term of this patent is extended or adjusted under 35 U.S.C. 154(b) by 328 days.

(21) Appl. No.: 14/995,528

(22) Filed: Jan. 14, 2016

(65) Prior Publication Data
US 2016/0207798 A1    Jul. 21, 2016

Related U.S. Application Data

(60) Provisional application No. 62/103,695, filed on Jan. 15, 2015.

(51) Int. Cl.
*C02F 1/44*    (2006.01)
*B01D 61/36*   (2006.01)
(Continued)

(52) U.S. Cl.
CPC ............ *C02F 1/442* (2013.01); *B01D 61/362* (2013.01); *B01D 63/087* (2013.01); *B01D 69/10* (2013.01);
(Continued)

(58) Field of Classification Search
CPC ...... C02F 1/442; C02F 1/448; C02F 2103/08; B01D 61/362; B01D 61/027; B01D 71/02;
(Continued)

(56) References Cited

U.S. PATENT DOCUMENTS

| 8,292,092 B2 | 10/2012 | Strauss et al. |
| 8,361,321 B2 | 1/2013 | Stetson et al. |

(Continued)

FOREIGN PATENT DOCUMENTS

| CN | 102908906 A | 2/2013 |
| GB | WO2014027197 | * 2/2014 |

OTHER PUBLICATIONS

Zongli Xie, Derrick Ng, Manh Hoang, Tuan Duong, Stephen Gray, Separation of aqueous salt solution by pervaporation through hybrid organic—inorganic membrane: Effect of operating conditions, Desalination, vol. 273, Issue 1, pp. 220-225. (Year: 2011 ).*

(Continued)

*Primary Examiner* — Pranav N Patel
(74) *Attorney, Agent, or Firm* — Scully Scott Murphy & Presser (57) ABSTRACT

A method for the desalination of water, the method comprising flowing salt water through a free-standing single-layer membrane of nanoporous graphene having a first planar side that makes contact with the salt water and an opposing second planar side from which desalinated water exits, wherein said membrane contains nanopores having a size of up to 1 nm, along with a substantial absence of pores above 1 nm in size, wherein said nanopores up to 1 nm in size have pore edges passivated with silicon, wherein salt ions in said salt water are blocked from passing through said (Continued)

membrane while water in said salt water passes through said membrane to result in desalinated water exiting said membrane.

26 Claims, 5 Drawing Sheets (51) Int. Cl.
B01D 71/02 (2006.01)
B01D 63/08 (2006.01)
B01D 69/10 (2006.01)
C02F 103/08 (2006.01)
C02F 101/10 (2006.01)

(52) U.S. Cl.
CPC ............ *B01D 71/021* (2013.01); *C02F 1/448* (2013.01); *C02F 2101/10* (2013.01); *C02F 2103/08* (2013.01); *Y02W 10/37* (2015.05)

(58) Field of Classification Search
CPC ...... B01D 71/021; B01D 69/02; B01D 69/10; B01D 69/12; B01D 69/0039; B01D 69/122; B01D 69/06; B01D 69/105; B01D 2325/02; B01D 2325/20; B01D 2325/04; B01D 2325/028; B01D 63/08; B01D 63/087; B01D 67/0072; B01D 67/0079; B01D 67/0069; B01D 2313/06; B01D 39/20; B01D 39/2055
See application file for complete search history.

(56) References Cited

U.S. PATENT DOCUMENTS

| 8,709,374 | B2 | 4/2014 | Cooper et al. | |
|---|---|---|---|---|
| 2006/0144781 | A1* | 7/2006 | Carlson | B01D 61/18 210/459 |
| 2011/0309016 | A1* | 12/2011 | Duke | B01D 61/364 210/636 |
| 2013/0105417 | A1* | 5/2013 | Stetson | C02F 1/442 210/806 |
| 2013/0256211 | A1 | 10/2013 | Fleming | |
| 2014/0116936 | A1 | 5/2014 | Kim et al. | |
| 2015/0231577 | A1 | 8/2015 | Nair et al. | |

OTHER PUBLICATIONS

Jeon, E.J. et al., "Pervaporation of butanol/water mixtures using siloxane polymer/ceramic composite membranes", Desalination and Water Treatment, (2012), vol. 48, pp. 17-26.
"Perforene Membrane, Addressing the Growing Demand for Efficient, Tailorable, Cost-Effective Filtration Solutions", Lockheed Martin's Perforene Membrane, 2 pages.
"Patent award for Lockheed Martin graphene membrane", http://www.desalination.biz/news/news_story/asp?id=6979, printed on: Nov. 11, 2015, 1 page.
"Lockheed Martin Achieves Patent for Perforene Filtration Solution, Moves Closer to Affordable Water Desalination", http://www.lockheedmartin.com/us/news/press-releases/2013/march/lockheed-martinach . . . , printed on: Nov. 11, 2015, 1 page.
Cohen-Tanugi, D. et al., "Water Desalination across Nanoporous Graphene", Nano Lett., (2012), vol. 12, pp. 3602-3608.
"Egyptian method filters seawater in minutes", http://www.scidev/net/global/water/news/egyptian-filters/seawater-environment/html, (Feb. 9, 2015) 3 pages.
Humplik, T. et al., "Nanostructured materials for water desalination", Nanotechnology, (2011), vol. 22, pp. 1-19.
Liu, S. et al., "Fast and controllable fabrication of suspended graphene nanopore devices", Nanotechnology, (2012), vol. 23, pp. 1-6.
Li, X. et al., "Large-Area Synthesis of High-Quality and Uniform Graphene Films on Copper Foils", Science, (Jun. 5, 2009), vol. 324, pp. 1312-1314, DOI: 10.1126/science.1171245.
Lee, J. et al., "Stabilization of graphene nanopore", PNAS, (May 27, 2014), vol. 111, No. 21, pp. 7522-7526.

* cited by examiner

NANOPOROUS GRAPHENE MEMBRANE FOR DESALINATION OF SALT WATER

CROSS REFERENCE TO RELATED APPLICATION

The present application claims benefit of U.S. Provisional Application No. 62/103,695, filed on Jan. 15, 2015, all of the contents of which are incorporated herein by reference.

GOVERNMENT SUPPORT

This invention was made with government support under Prime Contract no. DE-AC05-00OR22725 awarded by the U.S. Department of Energy. The government has certain rights in the invention.

FIELD OF THE INVENTION

The present invention generally relates to desalination membrane materials, and more particularly, to methods of desalinating salt water by use of such membrane materials, particularly carbon-based membrane materials.

BACKGROUND OF THE INVENTION

A scarcity of fresh water is a serious global challenge that is predicted to worsen in the future as demand continues to rise due to population growth, increased industrialization, and greater energy needs. Because seawater represents such a vast supply, desalination has become an important and promising approach to meet this ever-increasing demand for fresh water. Membrane-based separation of water using such techniques as reverse osmosis (RO) and capacitive deionization (CDI) are currently the most popular membrane processes because of their greater energy efficiency and capability for use at industrial scales. However, RO and CDI still have the drawback of requiring significant amounts of energy to operate. Particularly with the view of practicing desalination cost effectively and on a large scale, there would be a particular benefit in a water purification method with lower energy demands.

SUMMARY OF THE INVENTION

The instant disclosure is foremost directed to a method for desalinating water. The method disclosed herein represents a significant advance over existing popular membrane technologies, such as RO and CDI, for at least the reason that the method can operate with negligible power input, or even without a power input, while providing at least the level of desalination provided by existing energy-demanding methods. The desalination method described herein advantageously does not require an applied pressure, as used in RO, or a voltage, as used in CDI. Moreover, in particular contrast to CDI technology, the method described herein can operate by use of only a single membrane (i.e., not a two-electrode system) that functions by hindering or blocking the transport of ions, instead of absorbing the ions as in the CDI process.

In particular embodiments, the method involves flowing salt water through a free-standing single-layer (single-atom-thick) membrane of nanoporous graphene having a first planar side that makes contact with the salt water and an opposing second planar side from which desalinated water exits. The membrane contains nanopores having a size of up to 1 nm, along with a substantial absence of pores above 1 nm in size, wherein the nanopores up to 1 nm in size have pore edges passivated with silicon. In the method, salt ions in the salt water are blocked from passing through the membrane while water molecules in the salt water pass through the membrane to result in desalinated water exiting the membrane. The instant disclosure is also directed to the nanoporous graphene membrane used in the method, as well as methods for producing the nanoporous graphene membrane.

BRIEF DESCRIPTION OF THE DRAWINGS

FIGS. 1A-1C.

FIGS. 2A-2F.

FIGS. 3A-3C.

DETAILED DESCRIPTION OF THE INVENTION

The method described herein for the desalination of water employs a single-layer membrane of nanoporous graphene (hereinafter also referred to as "graphene membrane"). In the method, salt water is flowed through the graphene membrane, with the result that the salt ions in the salt water are substantially or completely blocked from passing through the membrane while water molecules (i.e., without salt species) in the salt water pass through the membrane to result in desalinated water exiting the membrane. The water can be made to pass through the membrane by any suitable means, such as by gravity or by the application of pressure. In some embodiments, the membranes described herein exhibit a salt rejection selectivity (i.e., level of removal or blockage of salt ions) of at least or above 90%, 95%, 98%, 99%, or even nearly or at 100%. The membranes described herein can also exhibit exceptionally high deionized water fluxes of at least or above $10^3$ g.m$^{-2}$ s$^{-1}$, $10^4$ g.m$^{-2}$ s$^{-1}$, or $10^5$ g.m$^{-2}$ s$^{-1}$ at a temperature of, for example, 20° C., 30° C., 40° C., 50° C., 60° C., 70° C., or 80° C., or at a temperature within a range bounded by any two of the foregoing temperatures.

Graphene, and in particular, single-layer graphene films, are well known in the art with well-established procedures for their preparation, e.g., Vlassiouk et al., *Carbon,* 54, pp. 58-67, 2013 and U.S. Pat. No. 9,187,824, the contents of which are herein incorporated by reference in their entirety. Many of the methods employ chemical vapor deposition (CVD) on a copper foil catalyst, with methane and hydrogen as feed gases. For purposes of the instant invention, the graphene is modified to be nanoporous, with nanopores of up to or less than 1 nm in size, along with a substantial or complete absence of pores at or above 1 nm in size. In different embodiments, the graphene contains nanopores of up to or less than 1, 0.9, 0.8, 0.7, 0.6, or 0.5 nm, or nanopores having a size within a range bounded by any two of the foregoing values (e.g., 0.5 to 1 nm, 0.5 to 0.9 nm, or 0.5 to 0.8 nm), or a range between one of the foregoing values and a minimum nanopore size of, for example, 0.3, 0.2, or 0.1 nm (e.g., 0.1 to 1 nm, 0.1 to 0.9 nm, or 0.1 to 0.8 nm). For nanoporous graphene fabrication, several approaches can be utilized, such as bombardment by ions or electrons, or oxygen plasma etching, as further discussed below in the Examples. In some embodiments, the graphene membrane excludes a composite or mixture of graphene with another carbon allotrope, such as fullerenes (e.g., carbon nanotubes). In some embodiments, any of the foregoing carbon allotropes other than graphene are excluded from the graphene membrane or excluded from the desalination process altogether. Generally, for purposes of the instant invention, the term "graphene" excludes graphene oxide. In some embodiments, graphene oxide is excluded from the desalination process altogether.

For purposes of the instant invention, the nanopores have pore edges (i.e., pore rims) passivated with silicon atoms. As further discussed in the Examples, the silicon atoms advantageously stabilize the nanopores in the graphene by passivating the dangling carbon bonds around the pore rim. The silicon atoms may be introduced to reactive edge sites on the pores during the oxygen plasma etching process.

The graphene employed in the instant invention as a membrane is single-layer graphene. As well known in the art, the term "single-layer graphene" refers to a planar graphitic layer of single-atom thickness. The single-layer graphene may more particularly be considered as a single sheet of graphite of single-atom thickness.

The graphene employed in the instant invention can have any suitable crystallinity or lack thereof. In a first embodiment, the graphene is crystalline, or more particularly, polycrystalline or monocrystalline. In a second embodiment, the graphene is non-crystalline (i.e., amorphous).

In some embodiments, the graphene membrane is constructed exclusively of carbon, while in other embodiments, the graphene membrane includes an amount of one or a combination of non-carbon elements (i.e., hetero-elements), such as nitrogen, oxygen, sulfur, boron, phosphorus, or a metal, as long as the presence of one or more hetero-elements does not substantially obviate the graphene membrane from functioning according to its intended use for desalination of salt water. The amount of hetero element can be a minor amount (e.g., at least or up to 0.1, 0.5, 2, or 5 wt % or mol %) or a more substantial amount (e.g., about or up to 10, 15, 20, 25, 30, 40, or 50 wt % or mol %). In some embodiments, any one or more of the specifically recited classes or specific types of hetero-elements are excluded from the graphene membrane.

In the method, salt water is made to flow through a free-standing version of the single-layer nanoporous graphene membrane described above. The term "free-standing," as used herein, indicates that the portion of graphene membrane that the water flows through is not covered on either of its two planar sides by any other solid material. More particularly, although portions of the graphene membrane may be covered on one or both planar sides of the graphene membrane by a solid material, such as a solid support, the membrane includes at least one region (i.e., a window) in which the graphene is free-standing by not being covered by any solid material. Therefore, within the free-standing area of the membrane, the salt water flows only through the graphene membrane and not through a different solid porous material either before or after flowing through the graphene membrane. The free-standing portion of the membrane generally has a two-dimensional shape delineated by contours of the surrounding support. The free-standing window can have any suitable dimensions, but is generally at least or up to 1, 2, 5, 10, 50, or 100 microns in at least one (or both) dimensions. In some embodiments, the free-standing window through which the salt water flows is larger than 100 microns in at least one (or both) dimensions, e.g., at least or up to 1, 2, 5, 10, 20, 50, or 100 millimeters. The membrane may contain one or a multiplicity (e.g., two, three, four, five, or a large array) of such free-standing windows through which the salt water flows. The salt water is made to flow through at least or only through the free-standing portion of the graphene membrane. In some embodiments, the graphene membrane as a whole may be polycrystalline, but the free-standing window of the membrane that the water flows through may be monocrystalline if the free-standing window is no more than or smaller than the grain size of the graphene. In some embodiments, only the free-standing portion of the membrane is nanoporous while portions of the membrane outside of the free-standing portion are non-porous.

In the desalination method, salt water is flowed through the graphene membrane by contacting the salt water with a first planar side of the graphene membrane under conditions (e.g., by gravity or a pressure differential) that induce water to flow from the first planar side of the membrane to the opposing second planar side of the membrane. When the salt water makes contact with the first planar side of the graphene membrane, salt ions are substantially or completely blocked from passing through the membrane while water molecules in the salt water pass through the membrane to the second planar side, where water molecules, in the substantial or complete absence of salt species, exit. By this process, desalinated water exits from the second planar size of the graphene membrane.

The salt water can contain any cationic and anionic salt species, and the salt may be a single salt or a combination of salts. In a particular embodiments, the salts are those commonly found in seawater. Seawater generally includes at least sodium, potassium, magnesium, calcium, and chloride ions, all or a portion of which can be removed by the desalination method described herein. Some examples of salts commonly found in seawater include sodium salts, potassium salts, magnesium salts, and calcium salts, wherein the anion in such salts may be, for example, halide (e.g., chloride, bromide, or iodide), sulfate, carbonate, and/or carboxylates, all or a portion of which can be removed by the desalination method described herein. The salt water can include the salt species in any individual or total concentration, such as a concentration of at least or up to 1, 2, 5, 10, 20, 50, or 100 g/L, or a concentration within a range bounded by any two of the foregoing exemplary concentrations. The salt water may alternatively be effluent from an unprocessed or partially processed waste stream, such as a sewage or industrial waste stream. In order to prevent fouling and clogging of the graphene membrane, the waste stream is typically first substantially cleansed of particulate and organic matter. Depending on the origin of the waste stream, the salt species in the waste stream may be similar to or may substantially diverge from the salt composition in seawater. The desalination process described herein is expected to block any of a wide variety of ionic species, whether inorganic or organic, and whether common or uncommon. Some examples of waste or contaminant ionic species include, for example, ionic detergents and cleaners, metal ions, pharmaceutical salts, and ionic dyes.

In particular embodiments, the graphene membrane is disposed on (i.e., across) an opening of a container in which the salt water is placed. More particularly, the graphene membrane is secured over the opening of a container in such manner that the salt water must flow through only the membrane e., the first planar side of the membrane faces toward the interior of the container, and the portions of the membrane making contact with the opening are sufficiently sealed to ensure water flows only through the membrane). By this arrangement, the salt water can be easily desalinated by inverting the container so that the salt water makes contact with and flows through the membrane by the action of gravity. Alternatively, the container may have the graphene membrane disposed on an opening at the bottom of the container (or be in the inverted position) at the start, i.e., before introducing the first or successive batch of salt water, so that the salt water automatically flows through the membrane upon introduction of the salt water into the container. The container generally also includes a port for introducing the first batch of salt water, and possibly for recharging the container with successive batches of salt water after starting or completing a desalination process on the first batch of salt water. Depending on the extent of various other possible design features in the container, the port may be, for example, a simple opening or may include an opening/closing mechanism device, such as a door, cap, lid, or slidable panel. The opening/closing mechanism device may also, itself, also include the graphene membrane.

In some embodiments, the salt water is processed in batches, i.e., in a hatch-wise mode, as described above. In other embodiments, the salt water is processed in a continuous mode. In the continuous mode, salt water is continuously fed into a container having the membrane disposed on an opening of the container in such manner, as described above, that the salt water is made to continuously pass through the membrane. For example, salt water may continuously be fed into a container in which the membrane is disposed on an opening at the bottom of the container, in which case the salt water is gravity fed through the membrane to result in a continuously produced supply of desalinated water exiting the membrane. A capture container may also be included for capturing the desalinated water. If desired, the desalinated water may be further cleansed by conventional means or entered into one or more other pervaporation units for further cleansing. Whether in a batch-wise or continuous mode, in some embodiments, the process also includes periodic removal or dilution of the concentrated salt water formed at the first planar side of the membrane. In some embodiments, the concentrated salt water is removed and further processed, e.g., by evaporative means, wherein the salt may be useful as a commodity.

In some embodiments, the desalination method described above is more particularly configured as a pervaporation process. As well known in the art, a. pervaporation process involves permeation of a liquid through a membrane, followed by evaporation of the permeate as it exits the membrane (at the second side of the membrane). In pervaporation, one of the components in the liquid becomes enriched due to selective transport of one of the components over the other component. The difference in partial pressures between the two components is the driving force for the enrichment of one component over the other. The pervaporation process is typically employed in the art for dehydration of alcohols, removal of methanol from other organic solvents, or for the removal of trace amounts of organic contaminants from aqueous solutions. The pervaporation processes known in the art typically rely on polymer-based membranes. The instant invention modifies the conventional pervaporation process by applying the process to the desalination of salt water, and also, by using the graphene membrane, described above, in the pervaporation process. For purposes of the instant invention, water molecules substantially devoid of salt species are vaporized when reaching (i.e., contacting) the exit (second) side of the graphene membrane, and the vaporized water is then condensed in order to provide desalinated water. The pervaporation process, as herein practiced, makes use of the graphene membrane, described above, and any of the configurations in which the membrane is disposed on an opening of a container, as also described above, except that means are further included for ensuring vaporization and then condensation of the desalinated water exiting from the membrane. Pervaporation, or membrane distillation, offers a number of advantages over typical reverse osmosis processes. Because water vapor is transported through the membrane, a lower pressure difference is required to achieve high water flux. In addition, the probability of fouling is lower due to the reduced pressure. Finally, the energy required for the process is lower and can often be accomplished through waste heat or solar power. The temperature range for a typical pervaporation process is 40° C. to 80° C.

In the pervaporation method, the desalinated water emanating from the membrane may be vaporized by any of the means known in the art. Typically, at least one of an elevated temperature or reduced pressure is employed to elicit vaporization. If a combination of elevated temperature and reduced pressure is employed, a temperature lower than the boiling point of water (i.e., less than 100° C.) can be used, commensurate with the reduction in pressure. The temperature of the desalinated water at exit may be, for example, at or above 40° C., 50° C., 60° C., 70° C., 80° C., or 90° C., or within a range between any two of the foregoing temperatures. Since the vapor pressure increases as the temperature increases, the pervaporation process will be faster at higher temperatures. At lower temperatures (e.g., at or less than 40° C. or 50° C.), the pervaporation will occur, but at a slower rate than at higher temperatures. If a reduced pressure is employed, the reduced pressure is less than 1 atm. In different embodiments, the reduced pressure may be up to or less than, for example, 0.9, 0.8, 0.5, 0.2, or 0.1 atm. In embodiments where the desalinated water at exit is made to be elevated in temperature, the desalinated water can be made to be elevated in temperature by, for example, heating the salt water to an elevated temperature before and/or during the time it is run through the membrane, or heating the desalinated water at exit. In the case of heating the desalinated water at exit, a capture container may be included for capturing the desalinated water and to provide an enclosed area for temperature control. Either in the capture container or a separate container attached thereto, the vaporized water is condensed to provide the desalinated water. If desired, the condensed desalinated water may be further cleansed by conventional means or entered into one or more other pervaporation units for further cleansing.

Examples have been set forth below for the purpose of illustration and to describe certain specific embodiments of the invention. However, the scope of this invention is not to be in any way limited by the examples set forth herein.

EXAMPLES

I. Preparation of a Nanoporous Single-Layer Graphene Membrane

Figure 1A:
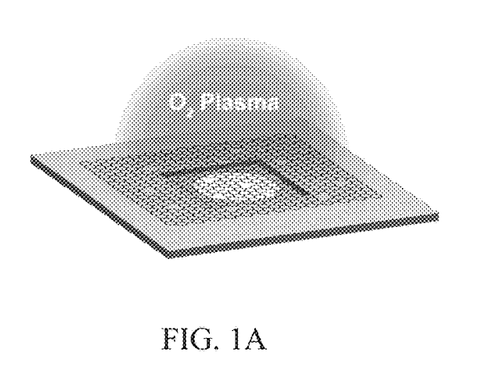
In FIG. 1A: Schematic of single-layer graphene being subjected to an oxygen plasma etch process while suspended over a hole in a support material.
Figure 1B:
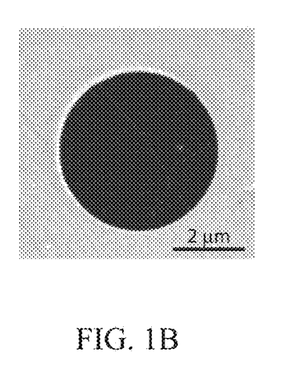
In FIG. 1B: SEM image of single-layer graphene suspended over a hole in a support material.
Figure 1C:
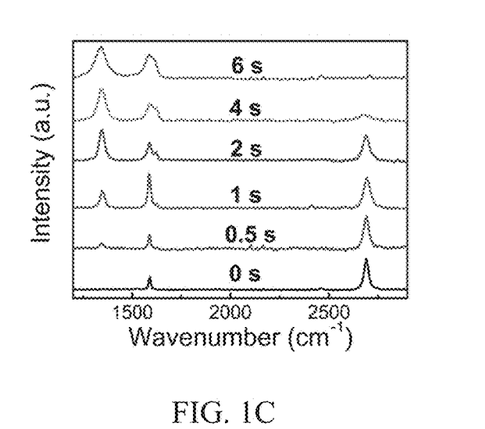
In FIG. 1C: Raman spectra (514 nm excitation) of suspended graphene after different exposure times to the oxygen plasma.

Single-layer graphene was synthesized using a previously-reported method of ambient pressure chemical vapor deposition (CVD) on a copper foil catalyst, e.g., I. Vlassiouk et al., *Carbon* 54, 58-67, 2013. FIG. 1A depicts single-layer graphene being subjected to an oxygen plasma etch process while suspended over a hole in a support material. The graphene was subsequently transferred onto a silicon nitride (SiN) microchip device that contained a single 5-μm hole (prepared by a standard clean room technique) using a standard polymer transfer method with poly(methyl methacrylate) (PMMA). Scanning electron microscopy (SEM) imaging, as shown in FIG. 1B, confirmed that the graphene layer suspended over the hole was intact with no visible ruptures or tears. This approach was sufficiently effective with more than 70% of transfer attempts yielding functional devices after SEM inspection. The quality of the suspended graphene was then evaluated using Raman spectroscopy. It should be noted that the laser spot of the Raman instrument was approximately 3 μm, which is smaller than the hole size in the SiN microchip, thereby permitting spectral analysis of only the suspended portion of the graphene. As shown in the Raman spectra in FIG. 1C, pristine suspended graphene exhibited a strong G peak (~1580 $cm^{-1}$) with no discernable defect peak, D, at 1350 $cm^{-1}$. The absence of a D peak suggests high quality graphene with a negligible number of defects introduced during the synthesis and transfer steps. Moreover, the 2D peak (~2700 $cm^{-1}$) is ~3 times stronger than the G peak with a line width<3 $cm^{-1}$ (Lorentzian lineshape), which further indicates that the graphene is single layer. The synthesis conditions were selected to generate graphene domains in excess of 50 μm, which makes the incidence of grain boundaries directly over the 5 μm holes unlikely, in agreement with the Raman measurements.

Nanopores were then introduced on the suspended graphene by exposure to oxygen plasma with a power of ~20 W for different times. As indicated by the Raman spectra in FIG. 1C, the intensity of the D peak ($I_D$) increased with increasing exposure time. Even after a short irradiation time of only 0.5 second, the D peak intensity rose to ⅓ of that for the G peak ($I_D/I_G$ ~0.333). After a longer exposure of 6 seconds, the 2D peak completely disappeared while the D and G peaks broadened to resemble those of a disordered carbon material, which indicates significant defect formation. The ratio of intensities of D and G peaks ($I_D/I_G$) has been extensively used as a measure of the integrity of graphene, and this ratio is also used here as a convenient measure of defects. However, it is important to note that Raman analysis generally does not provide comprehensive information about the various types of defects that may be present. As an example, alternative methods of defect formation, such as bombardment of electrons of different energies (250 V-20 kV) as well as gallium ions of 30 kV, were explored, but negligible species transport were observed through these membranes in contrast to the oxygen plasma treatment, despite similar variations in the Raman spectra.

II. Water Transport Properties of the Single-Layer Graphene Membrane

Figure 2A:
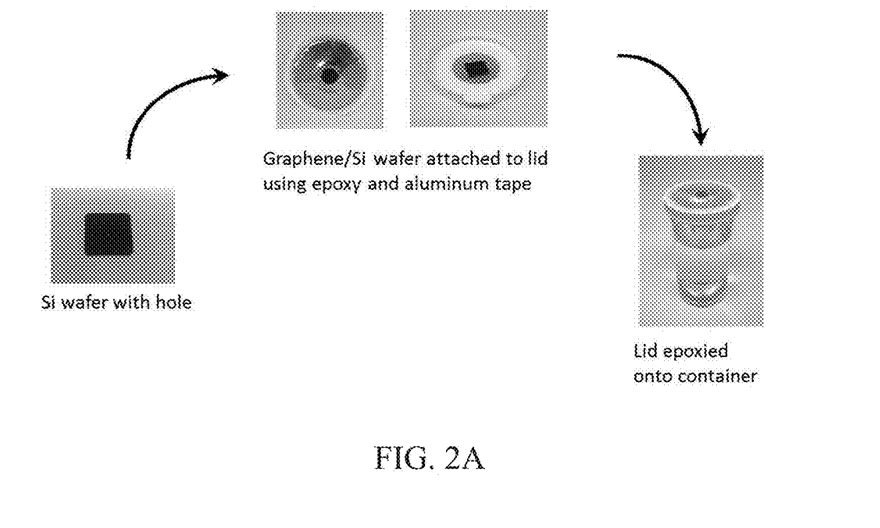
In FIG. 2A: Schematic showing assembly of an apparatus that contains a porous graphene membrane in a configuration where saltwater can be desalinated by simple inversion of a container holding the saltwater. In particular embodiments, the graphene membrane is on a silicon chip with a 5-µm hole in a 300-nm thick SiN membrane sealed on a glass vial filled with DI water. The apparatus can conveniently be used for water flux measurements, wherein water loss is measured by monitoring the vial's mass.
Figure 2B:
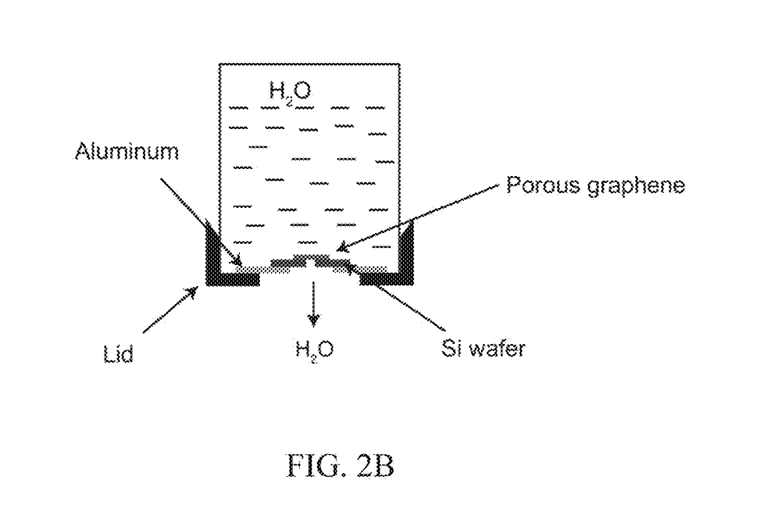
In FIG. 2B: Drawing depicting the desalination process that occurs when the container, such as shown in FIG. 2A, is turned upside-down (i.e., inverted) and placed in an oven at 40° C.
Figure 2C:
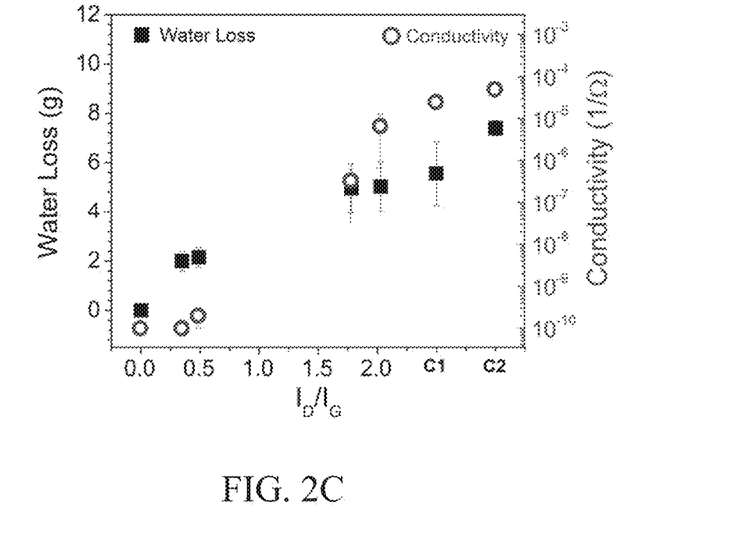
In FIG. 2C: Graph showing water loss after 24 hours, and ionic conductivity through the same porous graphene membranes etched at various exposure times. C1 and C2 are controls with large tears or completely broken graphene membranes.

The water transport properties of various plasma-etched graphene membranes were measured using deionized (DI) water and 6 mM KCl. The SiN microchip device (5-μm hole) with the suspended graphene membrane was sealed on top of a container partially filled with DI water using epoxy. FIG. 2A schematically depicts the process used for membrane transfer and sealing. As shown in the drawing of FIG. 2B, by inverting the container, the water came in direct contact with the graphene membrane and, by virtue of the epoxy seal, the only transport path available was through the porous graphene. The desalination process was conducted as a pervaporation process. Specifically, the inverted container was placed inside an oven maintained at 40° C., and the water transport was determined by measuring the mass of the water-filled container at regular time intervals and noting the mass decrease. The amount of water loss through pristine graphene, plasma-etched graphene, and a control (open 5-μm hole with no graphene) after 24 hours are shown in FIG. 2C. C1 and C2 are controls with large tears or completely broken graphene membranes. As expected, the controls exhibited the largest mass loss since there was no graphene to inhibit water transport. The pristine, non-etched graphene with $I_D/I_G=0$ showed no water loss after 24 hours, which indicates an intact membrane with no holes or tears, in agreement with prior SEM and Raman results. The foregoing result also agrees with previous reports demonstrating the impermeability of pristine graphene sheets.

Figure 2D:
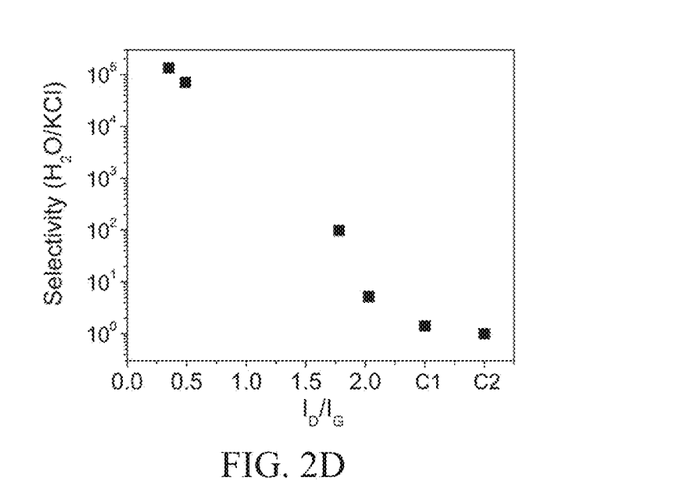
In FIG. 2D: Graph showing water/salt selectivity as a function of $I_D/I_G$ ratio showing exceptionally high selectivity for short etching time. The selectivity was calculated as a ratio of water flux to ionic conductivity from the graph in FIG. 2C normalized to water flux and conductivity of pores in SiN without graphene.
Figure 2E:
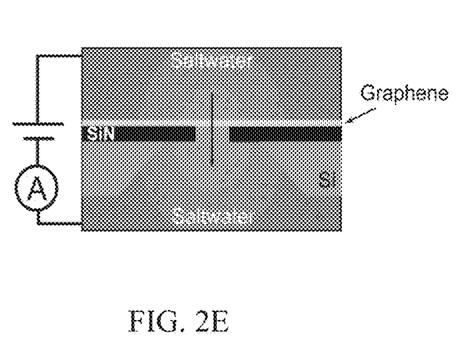
In FIG. 2E: Depiction of the experimental setup used for the I-V measurements in which two Ag/AgCl wires were used as electrodes.
Figure 2F:
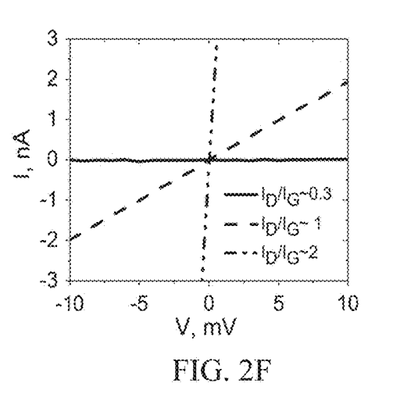
In FIG. 2F: Examples of I-V curves measured in 1M KCl solution across porous graphene membrane for different plasma exposure times.

The salt rejection, or selectivity, of the membrane is a key metric of performance. FIG. 2D shows the selectivity of the porous graphene membrane as a function of the amount of defects, or $I_D/I_G$ ratio. The selectivity is calculated as the ratio of the water flux to the conductivity for each graphene membrane normalized to the values obtained from a SiN wafer with an open 5-μm hole, i.e., no graphene present. At low plasma exposure times, the selectivity is extremely high, which indicates nearly complete salt rejection. As the exposure time increased, the number and size of pores in the graphene increased, resulting in a decrease in the selectivity. At $I_D/I_G=2$, the selectivity is similar to the controls (no graphene present) at a value of nearly one which indicates that both salt and water are transported through the membrane. In one version of the experiment, the ion transport was measured using a custom electrochemical cell. A schematic of the experimental setup is shown in FIG. 2E. In this measurement, the SiN with graphene membrane was mounted in the cell with two Ag/AgCl wire electrodes inserted on each side of the membrane. A voltage was applied across the membrane and the current could be measured as a function of this voltage. Typical curves are shown in FIG. 2F. For low $I_D/I_G$ ratios, the current is approximately zero and does not change with voltage. The zero current shows that there is no ion transport through the membrane, which is consistent with the other measurement methods. As the $I_D/I_G$ ratio increases, the slope of the current vs. voltage curve increases significantly, which indicates salt transport through the membrane.

In contrast, the nanoporous plasma-etched graphene samples exhibited water loss, and the rate of water transport was dependent on the plasma etching time. Even for the shortest exposure times with low defect density ($I_D/I_G \sim 0.5$), the nanoporous graphene membranes showed an unexpectedly high water loss rate that was only three times less than the control with an open 5-μm diameter hole. As the defect density increased, the water transport rate increased, reaching 60% of the control value for graphene with $I_D/I_G \sim 2$.

After verifying that water could flow through the porous graphene membrane, the next step was measuring the ion transport behavior. To that end, the same membranes used for water transport were analyzed for ion transport using 1 M KCl (or NaCl and LiCl) solutions in a custom electrochemical cell. As shown in FIG. 2C, the ionic current through the porous graphene membrane with a low defect density ($I_D/I_G \leq 0.5$) was almost non-existent (i.e., no transport of ions), which suggests extremely small pores, while the ionic current in the graphene membrane with high defect density, $I_D/I_G > 1$, was much greater, which indicates the presence of larger pores. Not surprisingly, the control sample (C2) with the open 5-μm hole had the highest ionic current, and the highest rate of water transport. From these results, it is Observed that the porous graphene membrane with low defect density, $I_D/I_G \leq 0.5$, showed both extremely low ionic current and measurable water transport, i.e., it successfully functioned as a desalination membrane with effective salt rejection. The selectivity values were calculated as the ratio of water flux to salt transport normalized to the fluxes through pores without a graphene membrane (Eq.1).

$$S = \frac{J_{H_2O}}{J_{max}} \bigg/ \frac{I_{salt}}{I_{max}} \quad (1)$$

In Equation (1), $J_{H_2O}$ and $I_{salt}$ are the water flux and the ionic current, respectively, through the graphene membrane, while $J_{max}$ and $I_{max}$ are the water flux and the ionic current though a 5-μm hole in SiN membrane without graphene (C2 sample). For such a definition of selectivity, S=1 for a fully non-selective membrane while S>1 for a membrane that is selective toward water molecules and rejects dissolved ions.

In an alternative experiment, a salt solution of water (conductivity of 950 μS/cm) was used to simultaneously measure both water transport and ion transport through the graphene membrane. In this measurement, the permeate water was collected using a second container mounted beneath the membrane and sealed from the atmosphere to prevent evaporation of the permeate water. The results are shown in Table 1 below. The water transport rate for the salt solution was comparable to the pure DI water measurement previously described. However, the conductivity of the permeate solution was<11 μS/cm, or almost three orders of magnitude lower than the feed salt solution, which confirms that the porous graphene functioned as a desalination membrane.

TABLE 1

Properties of KCl solution (6 mM) filtered through graphene membranes.

| Sample | Feed solution conductivity | Water collected after 24 hours | Permeate conductivity |
|---|---|---|---|
| SiN pore | 950 μS/cm | 7.2 mL | 675 μS/cm |
| Graphene/SiN pore | 950 μS/cm | 0 | — |
| Porous Graphene/SiN pore ($I_D/I_G = 0.6$) | 950 μS/cm | 5 mL | <11 μS/cm |

Thus, both experiments confirmed a high selectivity in water transport through oxygen plasma-treated single-layer graphene membranes. As FIG. 2C demonstrates, the salt rejection for the low defect density membranes was exceptionally high. The selectivity of the porous graphene membrane with $I_D/I_G \leq 0.5$ was almost $S \sim 10^5$, which corresponds to nearly 100% salt rejection. The selectivity dropped precipitously to $S \sim 10$ for $I_D/I_G \sim 2$, which indicates that extended plasma exposure not only increases the number of defects in the graphene, but also enlarges the pores as well, perhaps by merging of the pores.

Figure 3A:
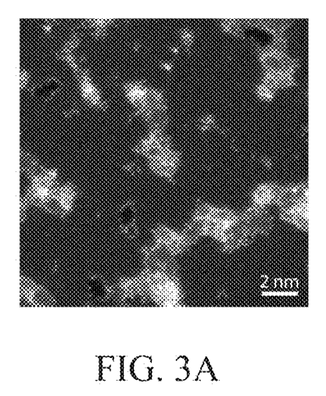
In FIGS. 3A and 3B: Aberration-corrected STEM images of graphene after 6-second exposure to oxygen plasma, with STEM image in FIG. 3B being of higher magnification than STEM image in FIG. 3A. The pores with characteristic dimensions of 1 nm are clearly seen.
Figure 3B:
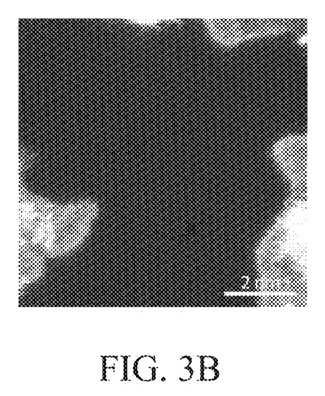
Figure 3C:
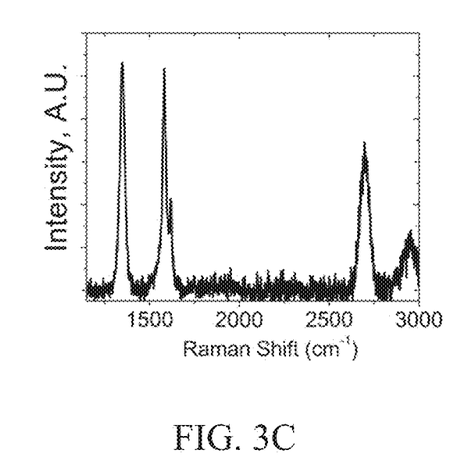
In FIG. 3C: Raman spectra of graphene sample used for STEM imaging in FIGS. 3A and 3B, which shows $I_D/I_G \sim 1$.

The porous membranes were also analyzed using aberration-corrected STEM. FIGS. 3A and 3B show the STEM images, wherein the image in FIG. 3B is of higher magnification than the image in FIG. 3A. Based on the medium angle annular dark field (MAADF) STEM images, the pore sizes are in the range of 0.5 nm to 1 nm, which was found to be an optimal pore size for rejecting small ions while still permitting water transport. Larger pores were not observed, although they are probably more difficult to eliminate in samples of larger area. Raman measurements for the sample in FIG. 3C reveal that the $I_D/I_G$ ratio is approximately 1, which suggests that the pore density is on the order of 1 pore/100 nm², which is in agreement with the STEM images in FIGS. 3A and 3B.

A further surprising observation is that the majority of the pores appear to be terminated not by carbon, but by silicon atoms, as indicated by the bright atoms that decorate the pore edges in the STEM images in FIGS. 3A and 3B. The silicon atoms likely attach to reactive edge sites during the oxygen plasma etching process. At this stage, the origin of the silicon atoms is not confirmed and, besides the above-mentioned possible origination from oxygen plasma treatment, the silicon atoms may arise from other sources, including the quartz CVD tube.

The instantly described graphene membranes plasma-etched for short exposure times exhibited an extremely high salt rejection rate, which could be a result of several factors. First, plasma etching has been conventionally practiced on graphene lying on a substrate. In contrast, the nanoporous graphene described in this application was produced by etching a suspended graphene, not graphene on a substrate. Although not completely understood at this time, it is believed that the rate of defect production and the morphology of the pores provided by etching on suspended graphene are different than what is provided by etching on supported graphene, and it is further believed that this difference in defect production and pore morphology at least partially accounts for the exceptionally high salt rejection selectivities and water fluxes observed in the graphene membranes herein studied. Second, it has been well illustrated that structural defects in graphene, such as grain boundaries, are the most vulnerable points for chemical alteration. The graphene membranes described herein, however, are composed of monocrystalline single-layer graphene, which is less prone to chemical modification. Significantly, the active size of the graphene membrane suspended over the hole is significantly smaller than the domain size of the synthesized graphene. Finally, the above-described plasma-etching treatment combines a similar defect production capability exhibited by high energy ion bombardment with a time-tuned oxidative atmosphere that employs a fewer number of processing steps, each of which increases the potential for mechanical disruption and tear formation. Although the control and precision of the pores using oxidation may not be as good as with ion bombardment, oxidation uses fewer steps and is more amenable to scale up.

A particularly intriguing observation was the exceptionally high rate of water transport through the porous graphene, which was much higher than previously reported R. R. Nair, et al., *Science,* 335, 442-444, 2012) despite the nearly 100% salt rejection rate. In the experiment, the graphene was in direct contact with the water and the total driving pressure across the graphene membrane, which was provided by gravity and the vapor pressure of water at 40° C., was estimated to be approximately 8 kPa. For the control sample with no graphene over the 5 μm open hole, the water flow rate was measured to be approximately 0.30 g h$^{-1}$ (or 4.2×106 g m$^{-2}$ s$^{-1}$), which is close to that estimated from the Hagen-Poiseuille expression with entrance/exit loss :

$$Q = \frac{\Delta P}{\mu} \frac{R^3}{C + \frac{8L}{\pi R}} \quad (2)$$

In Equation (2), C~1.5 and is the loss coefficient. R and L are the SiN pore radius and length, ΔP is the driving pressure, and μ is the water dynamic viscosity (H. L. Weissberg, *Phys. Fluids,* 5, 1033-1036, 1962). For the porous graphene membranes with $I_D/I_G$ ~0.5, the water flux was ~20% of the flux through the open 5-μm hole. Careful inspection of the efficacious samples studied herein eliminated any possibility of tears in the graphene membrane, and this was confirmed by the absence of salt transport. These results imply that there were no large pores, but rather, water transport through the graphene nanopores was somehow enhanced.

The above results demonstrate that oxygen plasma can be used as a very convenient method for the fabrication of tailored nanopores of desired dimension and chemical properties in suspended single-layer graphene with exceptional precision. The resulting nanopores exhibited very impressive water molecule selectivity over dissolved ions (e.g., K$^+$, Na$^+$, Li$^+$, and Cl$^{-1}$). The selectivity exceeded five orders of magnitude for low porosities but precipitously decreased at higher porosities most likely due to the enlargement of nanopores. Based on the estimated density of nanopores by Raman and STEM, ~1/100 nm$^2$, the estimated water flux through a single nanopore can reach impressively high values of 3-4 molecules per picosecond (ps), which exceeds the flux through aquaporin channels by three orders of magnitude and approximately by an order of magnitude greater than estimated from MD simulations for similar size pores (e.g., D. Cohen-Tanugi, J. C. Grossman, *Nano Lett,* 12, 3602-3608, 2012).

While there have been shown and described What are at present considered the preferred embodiments of the invention, those skilled in the art may make various changes and modifications which remain within the scope of the invention defined by the appended claims.

What is claimed is:
1. A method for the desalination of water, the method comprising flowing salt water through a free-standing single-layer membrane of nanoporous graphene having a first planar side that makes contact with the salt water and an opposing second planar side from which desalinated water exits, wherein said membrane contains nanopores having a size of up to 1 nm, along with a substantial absence of pores above 1 nm in size, wherein said nanopores up to 1 nm in size have pore edges passivated with silicon, wherein salt ions in said salt water are blocked from passing through said membrane while water in said salt water passes through said membrane to result in desalinated water exiting said membrane.

2. The method of claim 1, wherein said nanopores have a size of less than 1 nm, along with a substantial absence of pores of 1 nm or greater in size.

3. The method of claim 1, wherein said membrane is supported on a substrate having a window therein that said membrane spans and is free-standing over, and said salt water flows only through the free-standing portion of the membrane having a shape delineated by the window in said substrate.

4. The method of claim 1, wherein said salt water contains at least 10 g/L concentration of salt species.

5. The method of claim 1, wherein said salt ions comprise at least one of sodium and potassium ions.

6. The method of claim 1, wherein said salt water is seawater.

7. The method of claim 1, wherein said method produces desalinated water with at least 95% of said salt ions removed.

8. The method of claim I, wherein said method produces desalinated water with at least 99% of said salt ions removed.

9. The method of claim 1, wherein said graphene is monociystalline.

10. The method of claim 1, wherein said membrane is disposed on an opening of a container that contains said salt water, said container is inverted to contact said salt water with said first planar side of said membrane facing toward the interior of the container, and said salt water flows through said membrane by the action of gravity to result in desalinated water emanating from said second planar side of the membrane.

11. The method of claim 10, wherein said container includes a port for introducing a first batch of salt water into the container and for recharging said container with successive batches of salt water after starting or completing a desalination process on a first batch of salt water.

12. The method of claim 1, wherein said process is a continuous process in which salt water is continuously fed into a container having said membrane disposed on an opening at the bottom of the container, and said salt water is gravity fed through said membrane to result in desalinated water exiting the membrane.

13. The method of claim 1, wherein said method is a pervaporation method in which desalinated water exiting from said second planar side of the membrane is vaporized when the desalinated water is in contact with the second planar side of the membrane, and condensing the vaporized water to produce desalinated water.

14. The method of claim 13, wherein said membrane is disposed on an opening of a. container that contains said salt water, said container is inverted to contact said salt water with said first planar side of said membrane facing toward the interior of the container, and said salt water flows through said membrane by the action of gravity to result in desalinated water emanating from said second planar side of the membrane, and vaporizing the desalinated water when the desalinated water is in contact with the second planar side of the membrane.

15. The method of claim 13, wherein the desalinated water exiting from the second planar side of the membrane is vaporized by ensuring that the temperature of the desalinated water when emanating from the second planar side of the membrane is at least 40° C.

16. The method of claim 13, wherein the desalinated water exiting from the second planar side of the membrane is vaporized by subjecting the desalinated water when emanating from the second planar side of the membrane to a reduced pressure of less than 1 atm.

17. The method of claim 14, wherein said container includes a port for introducing a first batch of salt water into the container and for recharging said container with successive batches of salt water after starting or completing a desalination process on a first batch of salt water.

18. The method of claim 13, wherein said process is a continuous process in which salt water is continuously fed into a container having said membrane disposed on an opening at the bottom of the container, and said salt water is gravity fed through said membrane; and vaporizing and condensing the desalinated water exiting the membrane.

19. The method of claim 13, wherein the nanopores in said membrane have a size of less than 1 nm, along with a substantial absence of pores of 1 nm or greater in size.

20. The method of claim 13, wherein said membrane is supported on a substrate having a window therein that said membrane spans and is free-standing over, and said salt water flows only through the free-standing portion of the membrane having a shape delineated by the window in said substrate.

21. The method of claim 13, wherein the salt water contains at least 10 g/L concentration of salt species.

22. The method of claim 13, wherein salt ions in the salt water comprise at least one of sodium and potassium ions.

23. The method of claim 13, wherein the salt water is seawater.

24. The method of claim 13, wherein the method produces desalinated water with at least 95% of the salt ions removed.

25. The method of claim 13, wherein the method produces desalinated water with at least 99% of the salt ions removed.

26. The method of claim 13, wherein the graphene is monocrystalline.

* * * * *